(12) United States Patent
Liu et al.

(10) Patent No.: US 7,489,727 B2
(45) Date of Patent: Feb. 10, 2009

(54) METHOD AND DEVICE FOR ONLINE DYNAMIC SEMANTIC VIDEO COMPRESSION AND VIDEO INDEXING

(75) Inventors: Tiecheng Liu, Columbia, SC (US); John R. Kender, Leonia, NJ (US)

(73) Assignee: The Trustees of Columbia University in the city of New York, New York, NY (US)

( * ) Notice: Subject to any disclaimer, the term of this patent is extended or adjusted under 35 U.S.C. 154(b) by 821 days.

(21) Appl. No.: 10/987,646

(22) Filed: Nov. 12, 2004

(65) Prior Publication Data

US 2005/0213656 A1    Sep. 29, 2005

Related U.S. Application Data

(63) Continuation of application No. PCT/US02/18231, filed on Jun. 7, 2002.

(51) Int. Cl.
*H04N 7/12*    (2006.01)
(52) U.S. Cl. .............. 375/240.01; 375/240; 375/240.12
(58) Field of Classification Search ................. 375/240, 375/240.01, 240.12, 240.23
See application file for complete search history.

(56) References Cited

U.S. PATENT DOCUMENTS 6,219,837 B1    4/2001    Yeo et al. ....................... 725/38

6,222,886 B1 *    4/2001    Yogeshwar ............ 375/240.23

OTHER PUBLICATIONS

Tiecheng Liu and John R. Kender, Time-Constrained Dynamic Semantic Compression for Video Indexing and Interactive Searching, Proceedings of IEEE International Conference on Computer Vision and Pattern Recognition, vol. 2, pp. 531-538, Dec. 8-14, 2001.

Zhuang et al., Adaptive Key Frame Extraction Using Unsupervised Clustering, IEEE Internationa Conference on Image Processing, pp. 866-870 (1998).

* cited by examiner

*Primary Examiner*—Allen Wong
(74) *Attorney, Agent, or Firm*—Baker Botts LLP

(57) ABSTRACT

A technique for semantic video compression is shown in block (120). Uncompressed video data (210), including a plurality of video data segments (S1, S2, ... Sn), are organized into two or more buffer slots (220), such that each of the two or more buffer slots is filled with one or more of the received video data segments, thereby forming two or more buffered video portions corresponding to the two or more buffer slots. The buffered video data is then processed by a leaking rule, to extract one or more buffered video portions, while outputting one or more non-extracted buffered video portions, as compressed video data (230). The leaking rule data is stored in a histogram (240) and later used to organize and index data according to a users request.

43 Claims, 7 Drawing Sheets

METHOD AND DEVICE FOR ONLINE DYNAMIC SEMANTIC VIDEO COMPRESSION AND VIDEO INDEXING

CROSS REFERENCE TO RELATED APPLICATION

The present application is a continuation of International Patent Application No. PCT/US02/18231, filed Jun. 7, 2002, published on Dec. 18, 2003 as International Patent Publication No. WO 03/105489, the contents of which is hereby incorporated by reference in its entirety herein.

STATEMENT REGARDING FEDERALLY SPONSORED RESEARCH OR DEVELOPMENT

This invention was made with Government support under grants from the National Science Foundation, EIA-00-71954. As a result, the Government has certain rights in the invention.

BACKGROUND OF THE INVENTION

1. Field of the Invention

The present invention relates to video data compression and indexing and, more particularly, to a semantic compression and indexing of video data.

2. Description of Related Art

Video compression and indexing are crucial in multimedia applications. In recent years, a number of video compression and indexing techniques have been developed. One exemplary technique is a key frame selection technique, which selects key frames as indices for video data. The indices are then used for browsing, searching, retrieval and comparison of video data. Currently, the key frame selection techniques are based on video segmentation, frame clustering, or some hybrid thereof.

In Zhang et al., *Video Parsing and Browsing Using Compressed Data*, Multimedia Tools and Applications, Vol. 1, pages 89-111 (1995), an exemplary video segmentation technique is disclosed. In this technique, one or more representative key frames are selected for each segmented structural video unit and used as indices for video data.

However, video indexing and summarization methods based on video segmentation are tuned to highly structured and professionally edited commercial products. Typically, these products have camera shots that are rather short (on the order of four seconds), scene changes that are well-defined and frequent (about every 90 seconds or less), and changes in content and cinematography ("montage") that are visually appealing. These explicit and implicit rules of construction of such products are a great aid in the automated analysis and summary of such videos. For semi-edited or unedited videos like instructional videos, however, segmentation-based key frame selection is no longer appropriate because there are no salient structural units, and because the structural units do not represent meaningful semantic segments.

In Zhuang et al, *Adaptive Key Frame Extraction Using Unsupervised Clustering*, IEEE International Conference on Image Processing, pages 866-70 (1998), an exemplary video indexing technique based on clustering is disclosed. The clustering techniques avoid segmentation preprocessing; however, most video key frame clustering methods highly depend on thresholds which determine the size of cluster, the number of key frames, or the level of key frames in a key frame hierarchy. Since these thresholds vary greatly among different video genres or even within the same video genre, they are difficult to choose. Furthermore, most clustering-based methods are expensive with respect to time and storage.

Therefore, the key frame selection techniques known hereto, suffer from a common drawback in that they are either tuned to highly structured products or expensive. Accordingly, there remains a need for an inexpensive technique for compressing and indexing semi-edited or unedited video data. There also remains a need for semantically compressing video data at dynamically changing rates so that they would be accessible to a wide variety of platforms and connections, including some whose capacities are severely limited but can dynamically change. Moreover, there remains a need for a video indexing and summarization techniques that are user-tunable, particularly in domains in which there is little formal shot structure and a high amount of frame-to-frame redundancy.

BRIEF SUMMARY OF THE INVENTION

An object of the present invention is to provide inexpensive semantic video compression and indexing techniques.

Another object of the present invention is to provide a technique for deriving semantically summarized video by extracting less important video segments.

Yet another object of the present invention is to provide a technique for the semantic compression of video data at dynamically changing rates in view to provide accessibility to a wide variety of platforms and connections, including some whose capacities are severely limited.

Still another object of the present invention is to provide video indexing and summarization techniques that are user-tunable, particularly in domains in which there exists little formal shot structure and a high amount of frame-to-frame redundancy.

In order to meet these and other objects which will become apparent with reference to further disclosure set forth below, the present invention provides methods and devices for semantically compressing and indexing video data. An exemplary method for semantically compressing video data includes the steps of: (a) receiving uncompressed video data including a plurality of video segments; (b) organizing at least a portion of the received uncompressed video data into two or more buffer slots such that each of the buffer slots is filled with one or more of the received video data segments, thus forming two or more buffered video portions corresponding to the two or more buffer slots; (c) applying a leaking rule to the buffered video portions to extract buffered video portions therefrom; and (d) outputting buffered video portions which were not extracted in step (c) as compressed video data.

In a preferred embodiment, the applying step further includes the step of (i) evaluating each of the two or more buffered video portions to determine one or more significance values corresponding thereto; and (ii) using the determined significance values to extract one or more buffered video portions.

Advantageously, the applying step can further include the steps of (iii) saving the extracted video portions together with a corresponding determined significance value, and (iv) reorganizing buffered video portions which were not extracted to leave sequential empty buffer slots followed by filled buffer slots corresponding to the non-extracted buffered video portions.

In another highly preferred embodiment of the present invention, the method further includes the steps of: (e) organizing at least a second portion of the received uncompressed video data into the sequential empty buffer slots such that each of the buffer slots is filled with one or more of the received video data segments, thus forming two or more buffered video portions corresponding to the two or more buffered slots; (f) applying the leaking rule to the buffered video portions to extract buffered video portions therefrom; (g) outputting buffered video portions which were not extracted in step (f) as compressed video data; and (h) repeating steps (e)-(g) a predetermined number of times. The predetermined number of times is preferably a function of a compression ratio.

In another preferred embodiment, the extracted buffered video portions are recorded together with corresponding leaking rule data. In accordance with another aspect of the invention, a method for indexing the semantically compressed data is provided. The method includes the steps of labeling the output buffered video portions as top level units; and organizing the extracted video portions as a set of secondary units. The secondary units can include a set of video parameters corresponding to buffered video portions therein. The video parameters can include temporal video parameters, difference video parameters, object video parameters, etc. The secondary units may be organized by utilizing the corresponding leaking rule data. The leaking rule data preferably includes a set of ranking parameters. The ranking parameters may include temporal ranking parameters, difference ranking parameters, object ranking parameters, etc. The leaking rule data may also include one or more significance values, each significance value corresponding to a particular buffered video portion.

In another embodiment of the present invention, the secondary organizing step includes associating secondary units to top level units. The associating step preferably includes utilizing the leaking rule data corresponding to the extracted video portions to associate the top level units with the secondary units. The leaking rule datum corresponding to each extracted video portion preferably includes a set of relationship indicators corresponding to one or more buffered video portions located in adjacent buffer slots.

In yet another embodiment of the present invention, a computer readable medium used for semantically compressing video data is provided. The computer readable medium includes a program that causes a processor to: (a) receive uncompressed video data including a plurality of video segments; (b) organize at least a portion of the received uncompressed video data into two or more buffer slots such that each of the buffer slots is filled with one or more of the received video data segments, thus forming two or more buffered video portions corresponding to the two or more buffer slots; (c) apply a leaking rule to the buffered video portions to extract buffered video portions therefrom; and (d) output one or more buffered video portions which were not extracted as compressed video data.

A device for semantically compressing video data according to the present invention includes: (a) a buffer having two or more buffer slots, for receiving uncompressed video data including a plurality of video segments; (c) a processor, operationally coupled to the buffer, for (i) organizing at least a portion of the uncompressed video data received by the buffer into the two or more buffer slots such that each of the two or more buffer slots is filled with one or more of the received video data segments, thereby forming two or more buffered video portions corresponding to the two or more buffer slots; (ii) applying a leaking rule to the two or more buffered video portions to extract one or more buffered video portions therefrom; and (iii) outputting one or more buffered video portions which were not extracted from the buffer as compressed video data.

The processor-controlled buffer of the present invention advantageously helps determine which "non-key" portions may be extracted. The video segments enter the video buffer, and one or more portions of them are extracted, i.e., "leaked" away, from the buffer according to a predefined leaking rule. At the same time, the leakage activities, as well as the extracted video data, are recorded in a database using a kind of data structure that can recover the order of extraction ("leakage"). The video portions that are not extracted are the desired, semantically compressed, video portions, which are then outputted from the video buffer.

A device for video indexing and searching is based on a dynamic video compression according to the present invention. After the buffer-based compression process, the video portions left in the video buffer form the top level of the key frame hierarchy, and the other portions are ranked according to a set of predetermined rules, e.g., by their significance. Any level of significance or any number of these secondary units can be recovered from this predefined data structure, which provides an interactive searching method which is more psychologically accurate and functionally more efficient than the existing techniques.

Unlike most other key frames methods and devices that generate a fixed number of key frames or a fixed number of levels in a key frame hierarchy, this novel video indexing scheme can provide an arbitrary number of levels of key frames according to a user's requirement, which enables flexible interactive searching of content in videos.

Additionally, unlike key frame selection methods that are based on video shot detection or frame clustering, this semantic compression does not use video-dependent thresholds.

Unlike MPEG-1 and related compressions that encode full frames at a fixed rate, the time-constrained semantic video buffer selects video portions according to their semantic importance, but nevertheless balances this with the need to provide a long-term steady output rate. These semantically selected portions may be used in MPEG-4 as reference frames, or can be described in a script like that suggested by MPEG-7 together with other information.

The accompanying drawings, which are incorporated and constitute part of this disclosure, illustrate preferred embodiments of the invention and serve to explain the principles of the invention.

Figure 1:
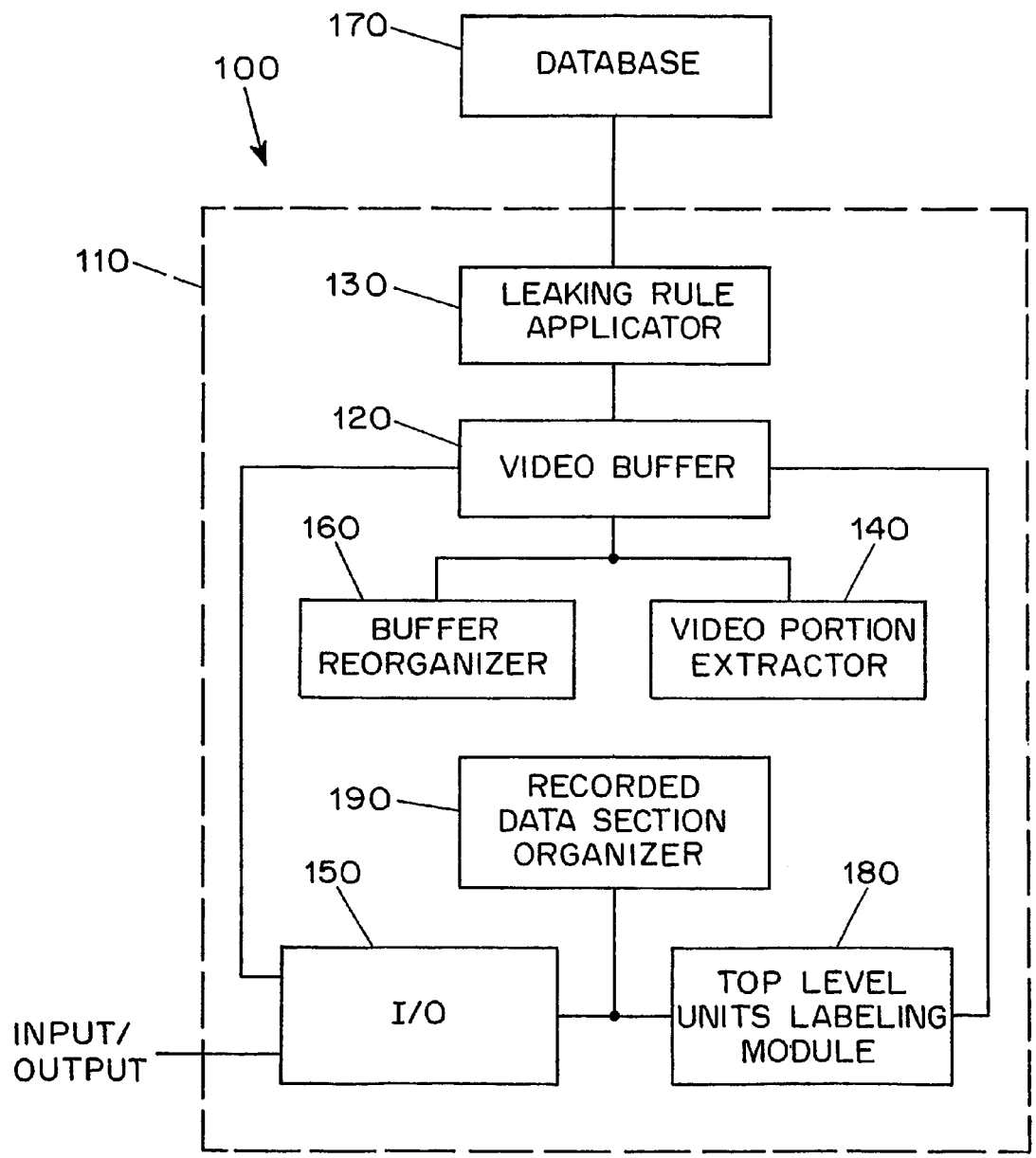
FIG. 1 is a block diagram of a system for semantically compressing and indexing video data according to the present invention.

Throughout the figures, the same reference numerals and characters, unless otherwise stated, are used to denote like features, elements, components or portions of the illustrated embodiments. Moreover, while the present invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

Referring to FIG. 1, an exemplary embodiment of the present invention will now be described. A system 100 for semantically compressing and indexing video data includes a processing subsystem 110 and a database 170. The processing subsystem 110 further includes a video buffer 120, a leaking rule applicator 130, a video portion extractor 140, an input/output (I/O) communication interface 150, a buffer reorganizer 160, a top level unit labeling module 180 and a recorded data section organizer 190.

Uncompressed video data which includes a plurality of video data segments is received via the I/O communication interface 150 and the video buffer 120 is filled with one or more video segments. In a preferred embodiment, the video buffer is a time-constrained video buffer. An exemplary time-constrained video buffer is a C++ Application shown in Appendix 1. The time constrained video buffer 120 has two or more buffer slots (See FIG. 2) each of which is filled with one or more video data segments, thereby forming two or more buffered video portions corresponding to the two or more buffer slots.

A leaking rule is then applied by the leaking rule applicator 130 to the two or more buffered video portions, and one or more buffered video portions are extracted by the video portion extractor 140. An exemplary leakng rule applicator 130 is a C++ software application shown in Appendix 2. An exemplary video portion extractor 140 is a C++ application shown in Appendix 3.

The extracted video portions may further be recorded together with corresponding leaking rule data in the database 170 and organized as secondary units by the recorded data section organizer 190. An exemplary recorded data section organizer 190 is a C++ application shown in Appendix 4. The buffered video data portions which were not extracted are then outputted from the buffer 120 and labeled as top level units by the top level unit labeling module 180. An exemplary top level unit labeling module 180 is a C++ application shown in Appendix 5. The top level units and the organized secondary units may then be presented for viewing via the I/O communication interface 150 or saved in the database 170.

Figure 2:
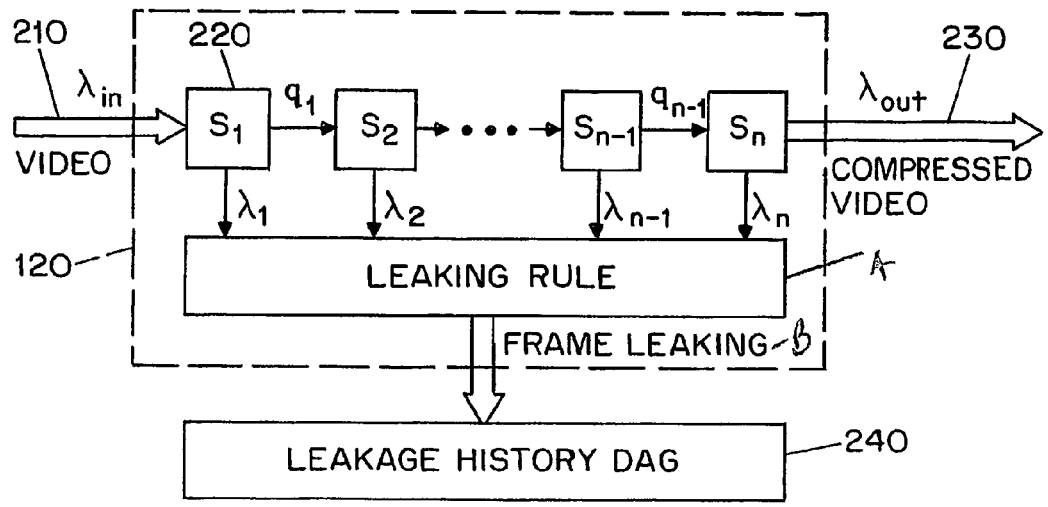
FIG. 2 is a block diagram of a time-constrained video buffer of the system from FIG. 1.

An exemplary semantic video buffer 120 is illustrated in FIG. 2. Referring to FIG. 2, the video buffer 120 receives uncompressed video data segments 210 and initially stores them in one or more buffer slots 220. The buffer 120 has n buffer slots 220. Each buffer slot 220 may hold one or more video segments 210. Once the buffer slots 220 are filled, a leaking rule is applied and one or more buffered video portions in the one or more buffer slots are evaluated and extracted, i.e., "leaked." One or more buffered video portions can "leak" at any slot position, based on, e.g., their significance values, semantic differences, etc. For example, the buffered video portions may be randomly evaluated and extracted or "leaked." Other leaking rules known in the art may also be used without departing from the spirit and scope of the invention. Such examples include, but are not limited to, using a semantic difference between two adjacent video frames as a leaking criterion, which is applied to frames that are found to be semantically similar to each other. Once a pair of frames, which are found to be the most similar, is detected, one of those frames may be extracted either randomly or according to a predetermined leaking criterion.

For a video buffer 120 with n slots 220 (slots $s_1, s_2, \ldots, s_n$), the video stream having a plurality of video segments 210 comes into $s_1$, moves through the buffer slots $s_2, s_3, \ldots, s_n$ in order, partially leaks video portions from the buffer 120 at any slot, and is finally outputted from the buffer 120 at slot $s_n$. The portions of the video stream output from the buffer 120 at slot $s_n$ form a semantically compressed version 230 of the original video stream. A preferred number of buffer slots is five.

Figure 3:
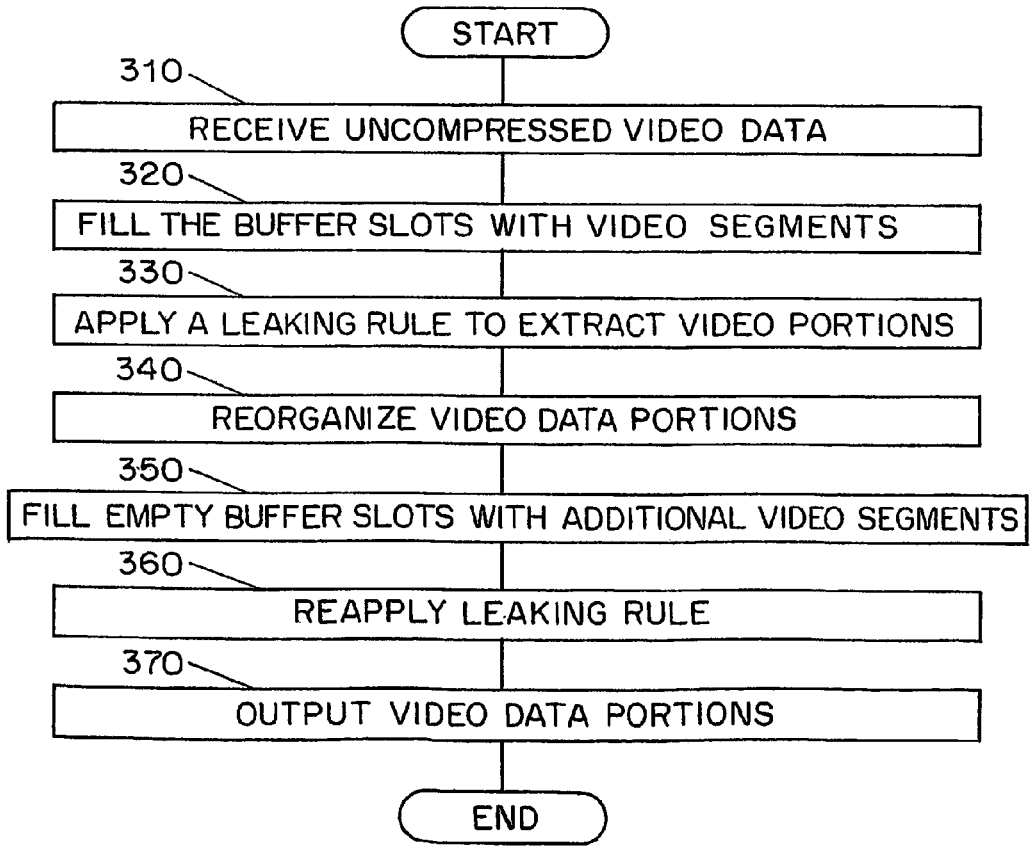
FIG. 3 is a flow diagram of a method for semantically compressing video data according to the present invention.

Referring to FIG. 3, a flow diagram of a method for semantically compressing video data according to the present invention is illustrated. The semantic compression process is initiated by receiving uncompressed video data, which includes a plurality of video segments (step 310). This is followed by a step 320 of organizing at least a portion of the received uncompressed video data into two or more buffer slots such that each of the two or more buffer slots is filled with one or more of the received video data segments, thus forming two or more buffered video portions corresponding to the two or more buffer slots. A portion may be a frame, several frames, a field or other suitable unit of video. In step 330, a leaking rule is applied to the two or more buffered video portions to extract one or more buffered video portions therefrom. The applying step 330 preferably includes evaluating each of the buffered video portions to determine corresponding significance values, using the determined significance values to extract one or more buffered video portions, and saving the one or more extracted video portions together with corresponding determined significance values. In step 340, the buffered video portions which were not extracted are reorganized, in order to leave one or more sequential empty buffer slots followed by one or more filled buffer slots corresponding to the non-extracted buffered video portions.

The compression method according to the present invention optionally includes a step 350 of organizing at least a second portion of the received uncompressed video data into one or more of the sequential empty buffer slots such that each of the two or more buffer slots is filled with one or more of the received video data segments, thereby forming two or more buffered video portions corresponding to the two or more buffered slots. Next, a step 360 of applying the leaking rule to the two or more buffered video portions may be included to extract one or more buffered video portions therefrom. In step 370, one or more buffered video portions which were not extracted in step 360 are outputted as compressed video data. Steps 340, 350 and 360 may be repeated a predetermined number of times. The predetermined number of times is preferably a function of a compression ratio.

In a preferred embodiment, every time a new video segment comes into $s_1$, any portion already in video buffer 120 either moves to its next buffer slot 220 or is removed, depending on its semantic difference from the adjacent video portions. This difference could be defined in many ways: it could be the $L^1$ norm of their histogram differences, the amount of residual object motion after background registration, some measure of instructional content differences, etc. Given a definition of the semantic differences between two video portions, the differences between all adjacent pairs of video portions in the buffer may be calculated. One of the two video portions in a pair whose semantic difference is the smallest is then extracted (leaked) according to a predetermined leaking criterion.

Various leaking criteria can be used, depending in part on their look-ahead effect on the measured semantic similarity of the frames remaining in the buffer 120. There are several leaking criteria, each of which quantifies the effect of dropping one or the other buffered video portion of a particular pair with a minimum semantic difference. One exemplary leaking criterion is a "min-min" criterion described in more detail further below.

It must be noted that a semantic video compression technique in accordance with the present invention also provides a QoS-enabled dynamic compression. A compression ratio can be changed dynamically by adjusting the output rate of a video buffer, and the dynamic compression delay is controlled by the size of the video buffer.

Compared with a fixed rate key frame selection technique, the method according to the present invention greatly reduces the chance of missing important video shots or semantically significant frames. At a compression factor of approximately 100, which is more severe than that of most general key frame selection techniques, this dynamic compression appears very useful in a client-server environment where some clients have severe bandwidth and display requirements, such as found with hand-held viewing devices. At a compression factor of approximately 1000, the output appears useful for semantic summarization of the video.

Figure 4:
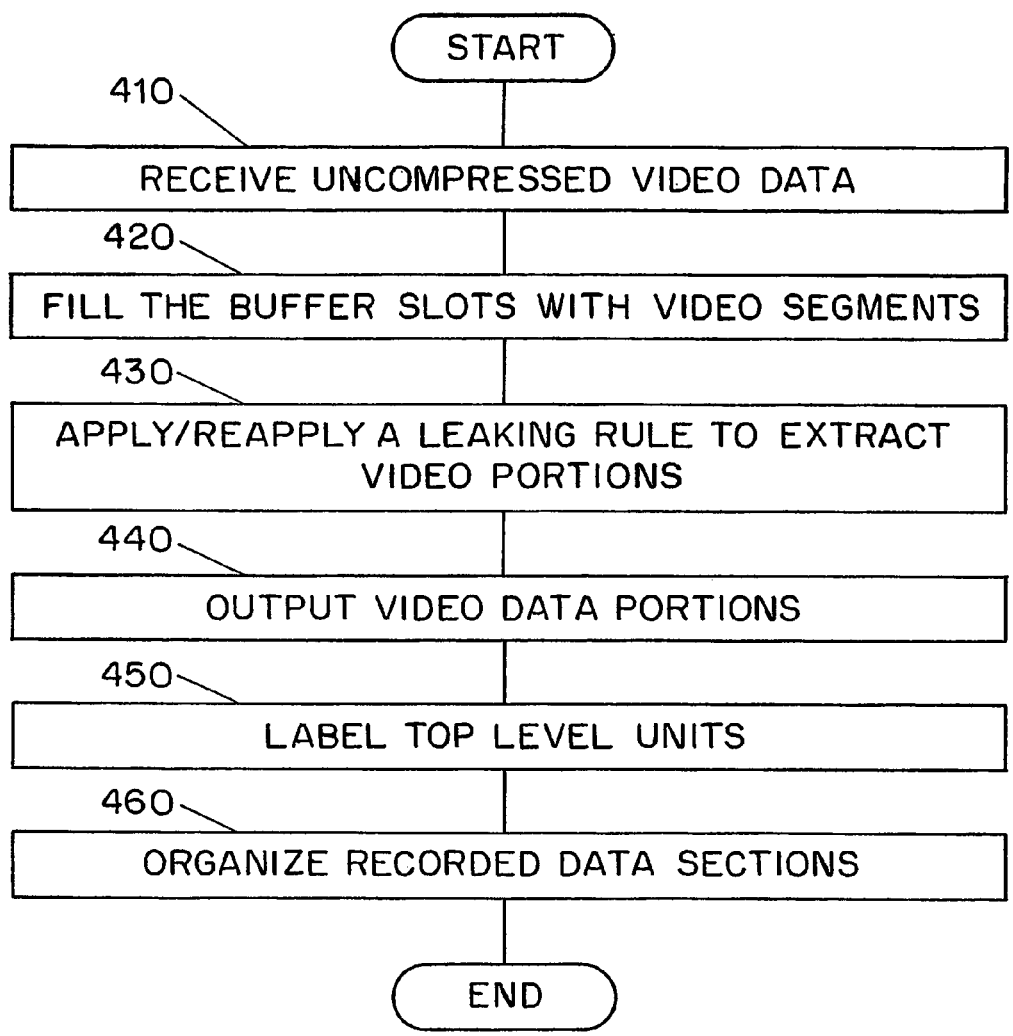
FIG. 4 is a flow diagram of a method for semantically indexing compressed video data according to the present invention.

Referring to FIG. 4, a flow diagram of a method for semantically indexing compressed video data according to the present invention is illustrated. The video indexing method according to the present invention is based on the previously described dynamic semantic compression. In step 410, uncompressed video data with a plurality of video segments is received. In step 420, at least a portion of the received uncompressed video data is organized into two or more buffer slots such that each of the two or more buffer slots is filled with one or more of the received video data segments, thereby forming two or more buffered video portions corresponding to the two or more buffer slots. In step 430, a leaking rule is applied to the two or more buffered video portions to extract and record one or more buffered video portions. In step 440, the buffered video portions that were not extracted from the video buffer 120 are output. In step 450, these output buffered video portions are labeled as top level units in a key frame hierarchy, and in step 460, the recorded video portions are organized, e.g., via a Leakage History Directed Acyclic Graph (DAG) 240 (See FIG. 2), which indicates the relative significance of all the frames.

By following this data structure, all frames can be referenced from the top level according to their significance. This provides a flexible video indexing scheme: a user can retrieve and view any level of semantic detail of the video.

This indexing scheme also permits a novel searching technique, useful when users cannot provide a clear searching template or when the video lacks annotation. In this technique, the appropriate level of semantically important key frames are automatically displayed at a fixed frame rate. Unlike most fast-forward methods in which the display time is proportional to real time, this results in display times which are proportional to semantic significance.

For example, in action movies, motion is often a user concern; semantic searching allocates more display time to those parts of the video with more motion, while compacting those parts with less motion.

Referring back to FIG. 2, frames in the video buffer 120 are extracted at a leaking rate determined by the incoming frame rate (set by the video source or server) and the output frame rate (set by a desired amount of top-level frames, or the available bandwidth to the client); the output frame rate can be changed dynamically over time.

For each incoming video segment, the leaking process selects which buffered video portion, e.g., one or more frames, in the video buffer to drop, and removes it from the queue. The queue, which may be implemented as a doubly-linked list, thus implicitly shifts all the frames to their successor buffer slots, freeing up the first slot again.

For an n-slot (slots $s_1, s_2, \ldots, s_n$) video buffer, let $d\{i,j\}$ be a semantic distance from frame i to frame j. If the minimum distance between any two adjacent frames in the video buffer 120 is $d_{k,k+1}$, then the frame k and the frame k+1 are evaluated as candidate frames for extraction. Which of the two frames to drop is determined by a leaking rule sensitive to the "video context" of the two frames, which is defined as the sequence of video frames that are within a predetermined neighborhood thereof.

For example, in a video sequence of $\{f_1,f_2,f_3,f_4,f_5\}$, the minimum video context of $f_3$ is the set $\{f_2,f_4\}$, although $\{f_1, f_2,f_4,f_5\}$ could also be so defined. The leaking rules compute the effect that extracting either frame k or k+1 have on their context, and the frame that accentuates the semantic individuality of the neighboring frames of the evolving compressed video stream is then extracted.

The leaking criterion of extracting $f_k$ or $f_{k+1}$ may depend on a video context of the frame set $\{f_{k+1}, f_{k+2}\}$, and may be defined by a "min-min" calculation, extracting the frame that has the minimum distance to its video context:

$$\min\{\min\{d_{k-1,k},d_{k,k+2}\},\min\{d_{k-1,k+1},d_{k+1,k+2}\}\} \quad (1)$$

This exemplary leaking criteria can maximize the minimum of all adjacent frame distances in the video buffer, thus allowing for a more efficient extraction of redundant frames and outputting of significant frames.

When the semantic video filter is used for dynamic compression, there is always a time delay between the frame numbers of the output compressed video stream and the incoming video stream. For a video buffer of n slots $s_1, s_2, \ldots, s_n$, a frame transition rate from the buffer slot $s_k$ to $s_{k+1}$ is $q_k$, so the average delay time between $s_{k+1}$ and $s_k$ is $t_k=1/q_k$. Likewise, because the video stream leaves the video buffer 120 at a designated frame rate $\lambda_{out}$, there is another delay of time $1/\lambda_{out}$ between the output video stream and the last video buffer slot $s_n$. The average delay time of the whole n slot video buffer is $$T = \sum_{k=1}^{n-1} \frac{1}{q_k} + \frac{1}{\lambda_{out}} \quad (2)$$

Using a mathematical model of a leaking probability, it can be shown that the average delay time of the semantic video filter monotonically increases with buffer size n, and is almost proportional to the product of the buffer size n and a compression ratio r. For more discussion, see Tiecheng Liu and John R. Kender, *Time-Constrained Dynamic Semantic Compression for Video Indexing and Interactive Searching*, Proceedings of IEEE International Conference on Computer Vision and Pattern Recognition, Vol. 2, pages 531-538, Dec. 8-14, 2001.

There is a trade-off between video buffer size and dynamic compression delay. Since the dynamic delay of the video buffer is proportional to the product of the compression ratio r and video buffer size n, a larger buffer size takes more memory and introduces more dynamic delay. However, a larger buffer size may increase the "video context", resulting in a more accurate video compression.

As previously indicated, when the leaking rule is applied to the two or more buffered video portions, one or more buffered video portions are extracted from the video buffer 120. The buffered video portions that were not extracted from the video buffer 120 are then outputted and labeled as top level units in a key frame hierarchy. However, at the same time, the extracted video portions, as well as the leakage activities, may be recorded in the Leakage History Directed Acyclic Graph (DAG) 240 (See FIG. 2).

Each record may contain e.g., a current extracted video portion number, two associated pointers, and two associated semantic distances. One of the two associated pointers is a "prev-pointer," which points to the record of the most recently extracted video portion adjacent to and sequentially before the buffer slot of the current video portion; "prev-distance" is a semantic distance between these two video portions. Similarly, "next-pointer" and "next-distance" refer to the most recently extracted video portion adjacent to and sequentially after the current video portion.

Records of buffered video portions that have not been extracted change dynamically during the compression process, but if and when the video portion is extracted from the video buffer, its record becomes and remains fixed. For example, if frames $f_{Ik}$, $f_{Ik-1}$, $f_{Ik+1}$ take the video buffer slots k, k−1 and k+1, respectively, after frame $f_{Ik}$ is extracted, the record of frame $f_{Ik}$ is fixed, but the "next-pointer" of $f_{Ik-1}$ and the "prev-pointer" of $f_{Ik+1}$ will be redirected to point to $f_{Ik}$, and their distances will also be updated correspondingly. This is further illustrated in FIG. 5.

Figure 5:
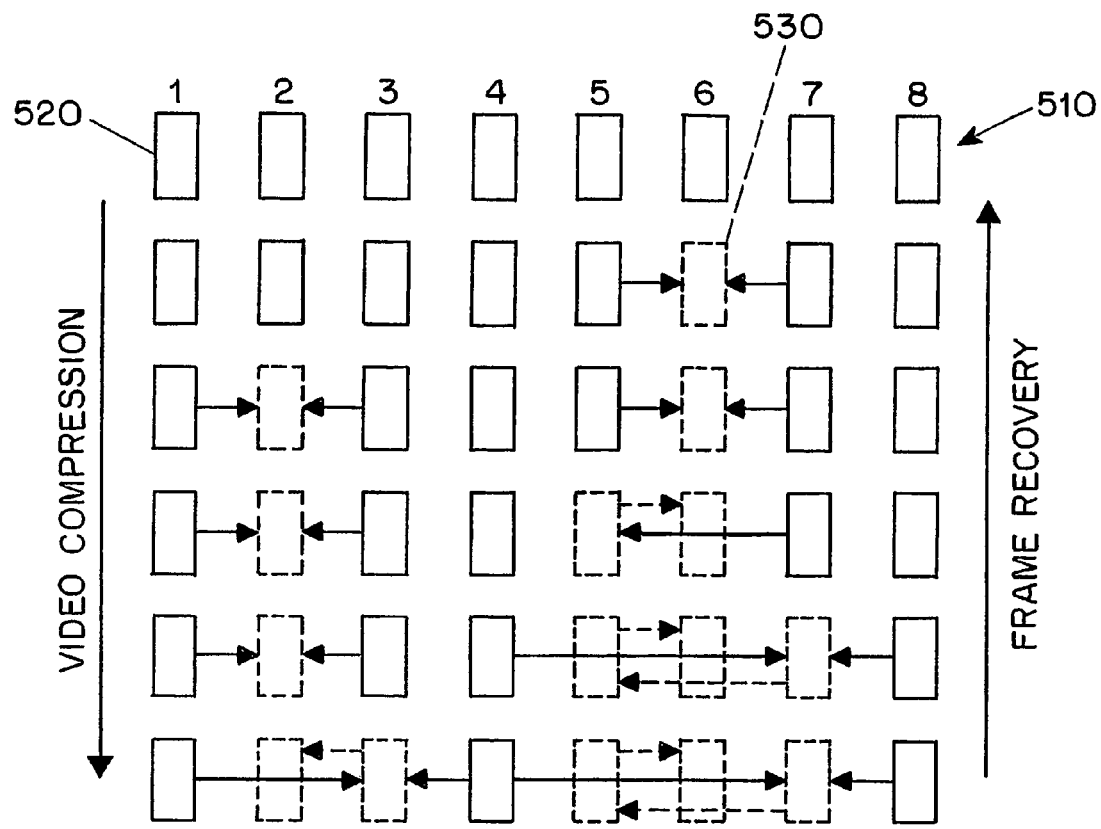
FIG. 5 is an illustrative diagram presenting an exemplary recordation of leakage activities in a video buffer with 8 buffer slots, as well as a relationship between a video compression process and a frame recovery process.

Referring to FIG. 5, an illustrative diagram presenting an exemplary recordation of leakage activities in a video buffer with 8 buffer slots, as well as a relationship between a video compression process and a frame recovery process is shown. A first row in FIG. 5 represents a video buffer 510 having eight buffer slots 520, where each buffer slot is filled with one or more buffered video portions. As previously described, when the leaking rule is applied, one or more buffered video portions are extracted leaving a corresponding number of empty slots 530. For example, in the second row, the buffered video portion from the slot 6 is extracted leaving slot 6 empty.

The records of the adjacent buffered video portions that have not been extracted change dynamically, so the "next pointer" of the buffered video portion 5 and the "previous pointer" of the buffered video portion 7 will be redirected to point to the extracted video portion 6. Similarly, their respective distances will be correspondingly updated. This is represented by the arrows pointing from the slots 5 and 7 towards the slot 6 in the second row.

After the leaking rule is reapplied, the buffered video portion from the slot 2 is extracted, as illustrated in row 3. Similarly, the records of the buffered video portions 1 and 3 will be dynamically changed to point to the extracted video buffer from the slot 2. After the third application of the leaking rule, the buffered video portion from the slot 5 is extracted and the records from the adjacent buffered video portions in slots 4 and 7 are updated to point to the extracted video portion 5. This is illustrated with the arrows in row 4. Note that the record of the buffered video portion in slot 7 has dynamically changed to point to the extracted video portion 5. As the buffered video portion from the slot 7 is extracted, as shown in row 5, the records of the adjacent buffered video portions 4 and 8 are dynamically changed to point to the extracted video portion 7. Similarly, in row 6, when the buffered video portion 3 is extracted, the records of the adjacent buffered video portions 1 and 4 dynamically change to point to the extracted video portion 3. It must be noted that the records of the extracted video portions remain fixed, as indicated by the dashed arrows in rows 4, 5 and 6.

After dynamic video compression, the semantically compressed video data that exited the buffer, plus any frames left in the buffer, are labeled as the top level units. All other video portions, organized as secondary units, can be recovered in hierarchical semantic order from these top level units, by following the pointers in their data records. This video portion recovery process is the inverse process of video compression.

As shown in FIG. 5, the top-down procedure shows frame leakage activity, and the bottom-up procedure shows the frame recovery process. The recovery can be parameterized e.g., by tree depth, by a semantic difference, etc.

It is noted that the video portion recovery process is complete, i.e., every video portion in a video sequence can be recovered from top level units following pointers in the video portion records. First, the top level units can be recovered directly from the top level structure. Second, if a video portion $f_{Ik}$ is not a top level unit, then at the time of its extraction two other top level units, $f_{Ik-1}$ and $f_{Ik+1}$, redirected to it their "next-pointer" and "prev-pointer", respectively. If both of these top level units remain in the top level, then $f_{Ik}$ is still accessible via either pointer. Third, one or the other of these pointing video portions may have also subsequently leaked. In this example, only one video portion is extracted at a time using the leaking rule, and it can be assumed, without any loss of generality, that $f_{Ik-1}$ leaked first. Its "next-pointer" was therefore unchanged, and it must still point to $f_{Ik}$, even though the "prev-pointer" of $f_{Ik+1}$ cannot do so. Thus, all video portions are either at the top level, or are pointed to by two frames that are in the top level, or are pointed to by a single frame that itself leaked at a strictly later time.

One issue in the key frame recovery process is the order of key frame recovery. For a key frame list $f_{k1}$, $f_{k2}$, ... $f_{kn}$, every frame record has two pointers, so there may be multiple choices for selecting which frame to retrieve as the next key frame. Preferably, a largest semantic difference criterion is used: among all non-null and not yet followed pointers in records of the current key frame list, the frame that has the largest difference from the current key frames is selected. These differences are already part of the frame records, and the largest of them can be efficiently selected by maintaining them in a heap.

The video portion recovery process provides a novel interactive approach for video indexing and interactive searching, since its semantic depth (or number of frames) is tunable by the user. It is more effective than searching either every r-th frame, or a fixed number of key frames, or a fixed key frame hierarchy.

Using the largest frame distance criterion to recover key frames one by one defines and induces a second data structure, the "significance array", in which the video data portions e.g., frames, are ranked in order of their significance. For convenience, a third data structure can also be provided, the "inverted significance array", which is an inverted array of the significance array. The significance array and the inverted significance array are further illustrated in FIG. 6.

As previously illustrated with reference to FIG. 5, certain buffered video portions are extracted from the buffer slots and organized as secondary units in the following order: 6, 2, 5, 7 and 3. The remaining buffered video portions that were not extracted, 8, 4, and 1, are outputted from the buffer and labeled as the top level units.

Figure 6:
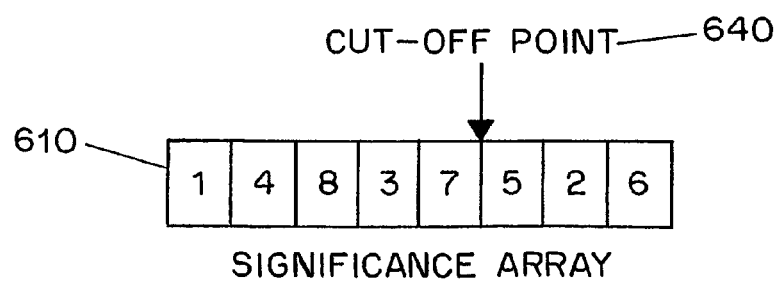
FIG. 6 is an illustrative diagram with a significance array and an inverted significance array of video data organized in FIG. 5.
Figure 6:
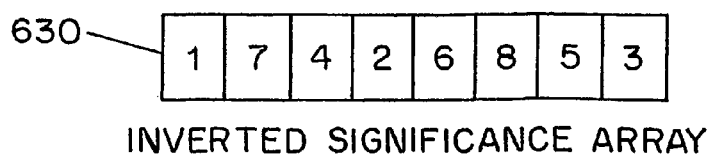

Referring to FIG. 6, a significance array 610 represents the video data compressed and organized in an 8-slot buffer of FIG. 5. The elements of the significance array are 1, 4, 8, 3, 7, 5, 2 and 6. As previously described, when the video data is semantically compressed and indexed, only the top level units are outputted and viewed by the user, while the extracted video portions are saved as secondary units in a database. In this example, the user would view only the outputted buffered video portions 1, 4 and 8. However, the user may change the criterion by moving a cut-off point 640 to include one or more extracted video portions. For example, the user can move the cut-off point to include the extracted video units 3 and 7. In this case, an inverted significance array 630 may be used to quickly determine which video portions may be displayed.

The complete retrieval data structure has two arrays. Together, they provide efficient ratio-adjustable semantic compression and efficient video playback at variable compression ratios. The significance array is ranked by frame significance.

The following procedure may be used to retrieve and/or play a specified subsequence of the video at a specified compression ratio. First, the number of key frames to be displayed is calculated. Then the "cut-off point" in the significance array is determined. Finally, the top level units are retrieved from the significance array, or the semantically compressed version of the video is played by checking if the values of corresponding elements in inverted significance array exceed the cut-off point.

For example, if it is desired to display the video portions from frame $f_{n1}$ to frame $f_{n2}$ at a compression ratio r, first, the number of key frames to be displayed is calculated: $k=[(n2-n1)/r]$. In the induced significance array, starting from the left end (most significant end), the records are checked one by one to find the k-th record whose frame number is within [n1,n2]; this is the cut-off point. Alternatively, the cut-off point can be estimated as N/r, where N is the total number of frames in the video.

To play a semantically compressed video at a ratio r from frame $f_{n1}$ to frame $f_{n2}$, the value from n1-th element until n2-th element is checked in the inverted significance array. If the value of the m-th (n1<m <n2) element is less than the cut-off point, the m-th frame is declared to be significant, and it is displayed. For example, the value of the first element in the inverted significance array 630 is 1, which refers to the first element of the significance array, the value of the second element of the inverted significance array is 7, which refers to the seventh element of the significance array etc. As indicated in the inverted significance array, the shaded elements 2, 5 and 6 of the inverted significance array having the values 7, 6 and 8, respectively, will not be displayed. The methods for creating significance arrays and inverted significance arrays are known in the art. An exemplary procedure for creating and using the significant arrays and inverted significance arrays in semantic compression is a C++ application shown in Appendix 6.

These two arrays can be also be generated off-line. While only the significance array may be used, for compressed video searching and playback purposes, the inverted significance array is preferably also used for better performance. This ratio-adjustable compression method is also useful in a client-server environment where the video server must provide a compressed video at different ratios to clients with different bandwidth requirements.

Figure 7A:
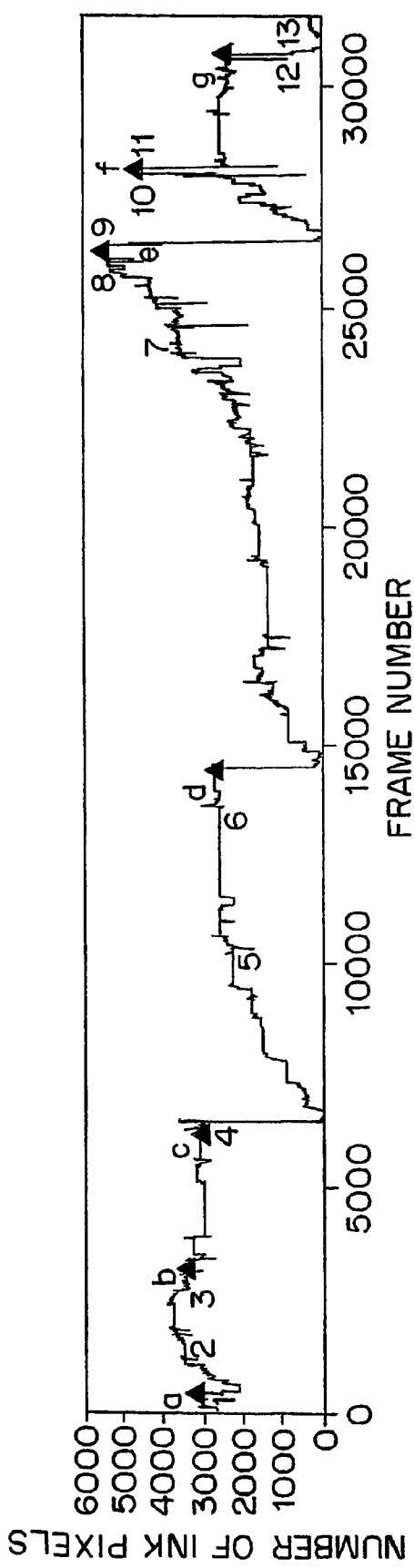
FIG. 7a is a Cartesian diagram illustrating a 17-minute instructional video.

As an illustration of the semantic compression techniques, a dynamic compression of an instructional video will now be illustrated. Referring to FIG. 7a, an illustrative diagram of a 17-minute instructional video is illustrated. Focusing on one dominant scene type of instructional video, that of handwritten lecture notes, an appropriate measure of semantic content is defined as "ink pixels." Low-level content extraction techniques recognize such "ink pixels." The semantic content difference is defined between two frames as the number of different "ink" pixels. This difference is used in the time-constrained video buffer, with the "min-min" leaking rule used for semantic compression.

Results on a 17-minute 32,000 frame video sequence show that even at a very high compression rate of 4000, the compressed video frames still contain all the content of the original video, as compared to a set of frames hand-selected as "ground truth," which represents a minimum frame set covering the content of a particular video sequence. Semantic compression using compression factors of 2000, 1000, 500, and 200 also captured the semantically important frames.

Figure 7B:
FIG. 7b is a set of 13 semantically compressed frames of a 17-minute instructional video.

The 13 frames that resulted from the compression at 4000 are displayed in FIG. 7b. Since the buffer is flushed at the end of the video, a frame number is somewhat more than 32,000/4,000=8 frames. The positions of these 13 frames are shown in the video sequence of FIG. 7a, with the seven triangle marks showing the positions of the seven frames hand-selected as ground truth. These seven frames form the minimum frame set covering the content of this video sequence.

Figure 8:
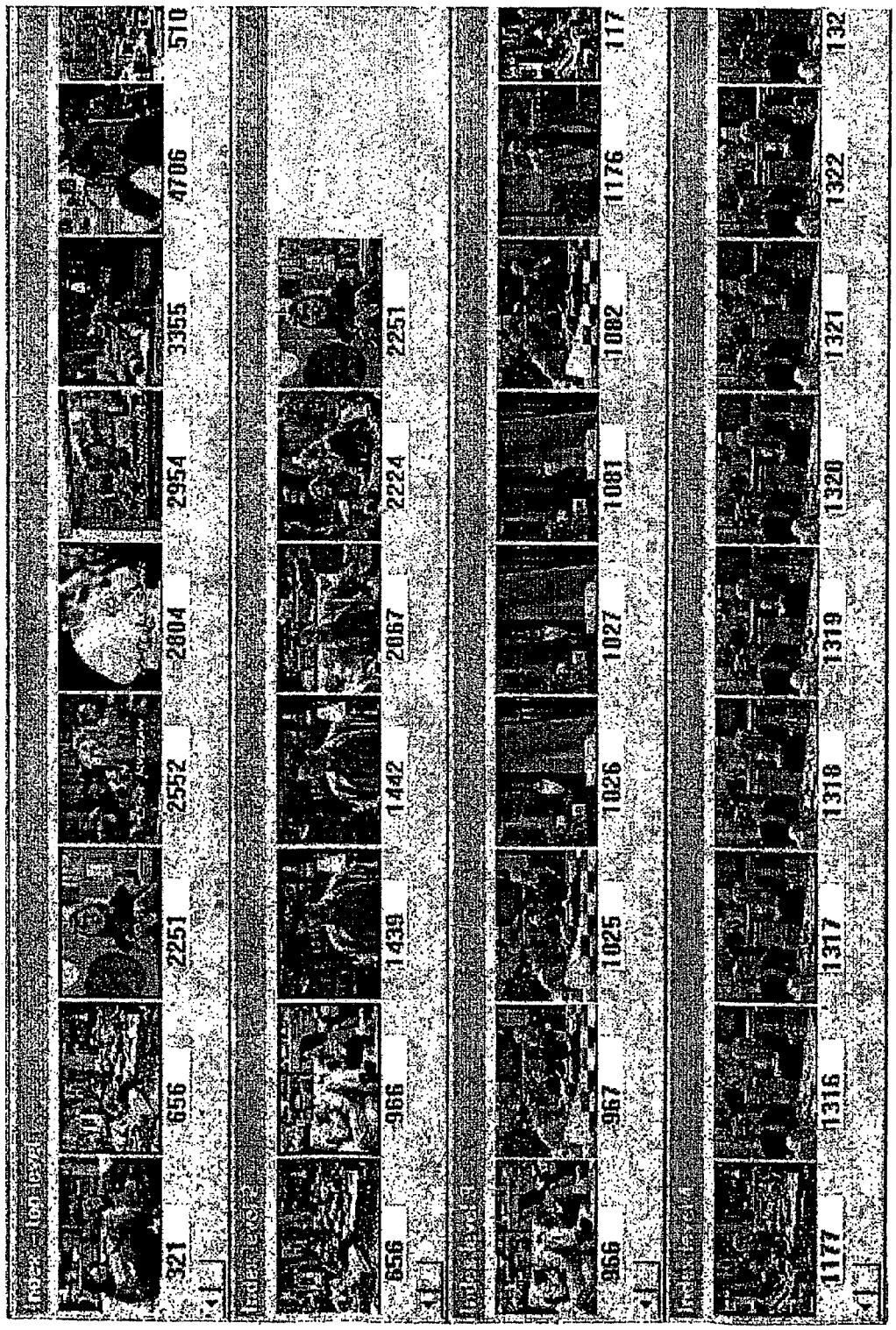
FIG. 8 is a set of video frames resulting from a semantic compression of an exemplary video data, illustrating reconstruction of video frames and "click-drag" function.

As an illustration of video indexing and interactive searching, a result of indexing a sitcom video is shown in FIG. 8. Referring to FIG. 8, the user is provided with a set of top level units, in this case 11 frames, from which he or she may choose a particular segment to view. This may be done by clicking on a start key frame and an end key frame. For example, the user may select a segment between a key frame 656, and a key frame 2251. Then, any number of key frames of this video segment can be shown for user review. For example, indexing level 2 provides 7 key frames in this segment. The user can choose to display more key frames, by using a simple "click-drag" operation. An exemplary "click-drag" is a C++ Application shown in Appendix 7. The user clicks on the end frame of the selected video segment, holds the mouse button and drags the mouse to the side. As the start key frame and the end key frame move apart, the next most significant key frames fill in the empty area. Using this simple operation, the user can get any number of key frames at a particular level.

This software tool also implements ratio-adjustable compressed video playback. By selecting start and end frames and a compression ratio, the semantically significant key frames will be displayed for interactive searching and fast viewing.

The foregoing merely illustrates the principles of the invention. Various modifications and alterations to the described embodiments will be apparent to those skilled in the art in view of the teachings herein. It will thus be fully appreciated that those skilled in the art will be able to devise numerous systems and methods which, although not explicitly shown or described, embody the principles of the invention and are thus within the spirit and scope of the invention.

The invention claimed is:

1. A method for semantically compressing video data, comprising the steps of:
   (a) receiving uncompressed video data including a plurality of video data segments;
   (b) organizing at least a portion of said received uncompressed video data into two or more buffer slots such that each of said two or more buffer slots is filled with one or more of said received video data segments, thereby forming two or more buffered video portions corresponding to said two or more buffer slots;
(c) applying a leaking rule to said two or more buffered video portions to extract one or more buffered video portions therefrom;
and (d) outputting one or more buffered video portions which were not extracted in step (c) as compressed video data.

2. The method of claim 1, wherein said organizing step comprises sequentially organizing at least a portion of said received uncompressed video data into two or more buffer slots such that each of said two or more buffer slots is filled with one or more of said received video data segments in sequence, thereby forming two or more buffered video portions corresponding to said two or more buffer slots.

3. The method of claim 1, wherein said applying step comprises the steps of:
(i) evaluating each of said two or more buffered video portions to determine a significance value corresponding thereto;
and (ii) using said determined significance values to extract one or more buffered video portions.

4. The method of claim 3, wherein said evaluating step comprises the steps of:
(A) calculating a histogram for each of said two or more buffered video portions;
and (B) determining a difference between a histogram calculated in step (A) for a first of said two or more buffered video portions and histograms calculated in step (A) for one or more other video portions of said two or more buffered video portions to determine a significance value for said first video data portion relative to said other video portions.

5. The method of claim 3, wherein said applying step further comprises the step of (iii) saving said one or more extracted video portions together with a corresponding determined significance value.

6. The method of claim 5, wherein said applying step further comprises the step of (iv) reorganizing one or more buffered video portions which were not extracted to thereby leave one or more sequential empty buffer slots followed by one or more filled buffer slots corresponding to said non-extracted buffered video portions.

7. The method of claim 6, further comprising the steps of:
(e) organizing at least a second portion of said received uncompressed video data into one or more of said sequential empty buffer slots such that each of said two or more buffer slots is filled with one or more of said received video data segments, thereby forming two or more buffered video portions corresponding to said two or more buffer slots;
and (f) applying said leaking rule to said two or more buffered video portions to extract one or more buffered video portions therefrom;
(g) outputting one or more buffered video portions which were not extracted in step (g) as compressed video data;
and (h) repeating steps (e)-(g) a predetermined number of times.

8. The method of claim 7, wherein said predetermined number of times is a function of a compression ratio.

9. The method of claim 7, wherein said saved extracted video portions and corresponding determined significance values are combined into said compressed video data.

10. The method of claim 3, wherein said plurality of video data segments of said uncompressed video data include one or more objects, each object having one or more object parameters, and wherein said applying step comprises the steps of:

(i) evaluating each of said two or more buffered video portions based on said one or more object parameters to determine a significance value corresponding thereto;
and (ii) using said determined significance values to extract one or more buffered video portions.

11. The method of claim 10, wherein said applying step further comprises the step of (iii) saving said one or more extracted video portions together with a corresponding determined significance value.

12. In a method for semantically compressing video data which includes the steps of:
(a) receiving uncompressed video data including a plurality of video data segments;
(b) organizing at least a portion of said received uncompressed video data into two or more buffer slots such that each of said two or more buffer slots is filled with one or more of said received video data segments, thereby forming two or more buffered video portions corresponding to said two or more buffer slots;
(c) applying a leaking rule to said two or more buffered video portions to extract one or more buffered video portions therefrom;
(d) recording said one or more extracted video portions together with corresponding leaking rule data;
and (e) outputting one or more buffered video portions which were not extracted in step (c) as compressed video data, a method for indexing said semantically compressed data, comprising the steps of:
(f) labeling the outputted video portions as one or more top level units;
and (g) organizing said one or more recorded video portions as a set of secondary units using said leaking rule data.

13. The method of claim 12, wherein said recorded leaking rule data includes a set of video parameters.

14. The method of claim 13, wherein said set of video parameters includes one or more temporal video parameters.

15. The method of claim 13, wherein said set of video parameters includes one or more difference video parameters.

16. The method of claim 13, wherein said set of video parameters includes one or more object video parameters.

17. The method of claim 12, wherein said step (g) comprises the step of utilizing a set of predetermined rules to organize said one or more recorded video portions as said set of secondary units.

18. The method of claim 12, further comprising the step of ranking said one or more recorded video portions using one or more predetermined ranking parameters prior to step (g).

19. The method of claim 18, wherein at least one of said one or more predetermined ranking parameters is a temporal ranking parameter.

20. The method of claim 18, wherein at least one of said one or more predetermined ranking parameters is a difference ranking parameter.

21. The method of claim 18, wherein at least one of said one or more predetermined ranking parameters is an object ranking parameter.

22. The method of claim 12, wherein said step (g) comprises the step of ranking said set of secondary units by using one or more significance values, each corresponding to one of said one or more video data portions.

23. The method of claim 12, wherein said step (g) includes utilizing said leaking rule data to associate each member of said set of secondary units with one or more of said top level units.

24. The method of claim 23, wherein said leaking rule data including datum corresponding to a particular extracted video portion comprises a set of relationship indicators corresponding to a previously extracted video portion.

25. The method of claim 24, wherein said leaking rule data including datum corresponding to a particular extracted video portion comprises a set of dynamic relationship indicators corresponding to one or more buffered video portions.

26. The method of claim 12, further comprising the steps of: (h) enabling a user to select at least one top level unit; and (i) reconstructing one or more secondary units corresponding to said at least one top level unit.

27. A computer readable medium encoded with a computer program that includes computer executable instructions for semantically compressing video data, which when executed causes a processor to implement the steps of:
(a) receive uncompressed video data including a plurality of video segments;
(b) organize at least a portion of the received uncompressed video data into two or more buffer slots such that each of the two or more buffer slots is filled with one or more of the received video data segments, thereby forming two or more buffered video portions corresponding to the two or more buffer slots;
(c) apply a leaking rule to the two or more buffered video portions to extract one or more buffered video portions therefrom;
and (d) output one or more buffered video portions which were not extracted as compressed video data.

28. The computer readable medium of claim 27, wherein said computer program further causes said processor to sequentially organize, in step (b), at least a portion of the received uncompressed video data into two or more buffer slots such that each of the two or more buffer slots is filled with one or more of the received video data segments, thereby forming two or more buffered video portions corresponding to the two or more buffer slots.

29. The computer readable medium of claim 27, wherein said computer program further causes said processor, in step (c), to implement the steps of:
(i) evaluating each of said two or more buffered video portions to determine a significance value corresponding thereto; and (ii) using said determined significance values to extract one or more buffered video portions.

30. The computer readable medium of claim 29, wherein said computer program further causes said processor, in step (c), to implement the steps of:
(A) calculating a histogram for each of said two or more buffered video portions;
and (B) determining a difference between a histogram calculated for a first of said two or more buffered video portions and histograms calculated for one or more other video portions of said two or more buffered video portions to determine a significance value for said first video portion relative to said other video portions.

31. The computer readable medium of claim 29, wherein said computer program further causes said processor, in step (c), to implement the step of (iii) saving the one or more extracted video portions together with a corresponding determined significance value.

32. The computer readable medium of claim 31, wherein said computer program further causes said processor, in step (c), to implement the step of (iv) reorganizing one or more buffered video portions which were not extracted to thereby leave one or more sequential empty buffer slots followed by one or more filled buffer slots corresponding to the non-extracted buffered video portions.

33. The computer readable medium of claim 31, wherein said computer program further causes said processor to implement the steps of:
(e) organizing at least a second portion of the received uncompressed video data into one or more of the sequential empty buffer slots such that each of the two or more buffer slots is filled with one or more of the received video data segments, thereby forming two or more buffered video portions corresponding to the two or more buffered slots;
(f) applying the leaking rule to the two or more buffered video portions to extract one or more buffered video portions therefrom;
(g) outputting one or more non-extracted buffered video portions as compressed video data;
and (h) repeating organizing, applying and outputting a predetermined number of times.

34. The computer readable medium of claim 29, wherein said plurality of video data segments of said uncompressed video data include one or more objects, each object having one or more object parameters, and wherein said computer program causes said processor, in step (c), to implement the steps of:
(i) evaluating each of said two or more buffered video portions based on said one or more object parameters to determine a significance value corresponding thereto;
and (ii) using said determined significance values to extract one or more buffered video portions.

35. The computer readable medium of claim 34, wherein said computer program further causes said processor, in step (c), to implement the step of (iii) saving the one or more extracted video portions together with a corresponding determined significance value.

36. The computer readable medium of claim 27, further comprising said computer program for indexing the semantically compressed data by causing said processor to implement the steps of:
(a) recording the one or more extracted video portions together with corresponding leaking rule data;
(b) labeling the outputted one or more video data portions as one or more top level units;
and (c) organizing the one or more extracted video portions as a set of secondary units.

37. A device for semantically compressing video data, comprising:
(a) a buffer having two or more buffer slots for receiving uncompressed video data including a plurality of video segments;
and (b) a processor, operationally coupled to said buffer, for (i) organizing at least a portion of the received uncompressed video data into the two or more buffer slots such that each of the two or more buffer slots is filled with one or more of the received video data segments, thereby forming two or more buffered video portions corresponding to the two or more buffer slots;
(ii) applying a leaking rule to the two or more buffered video portions to extract one or more buffered video portions therefrom;
and (iii) means, coupled to said buffer, for outputting one or more buffered video portions which were not extracted from the buffer as compressed video data.

38. The device according to claim 37, wherein said processor further includes:
(i) means for evaluating each of the two or more buffered video portions to determine a significance value corresponding thereto;

and (ii) means, coupled to said evaluating means, for using the determined significance values to extract one or more buffered video portions.

39. The device of claim 38, wherein said processor further includes:

(iii) means, coupled to said using means, for recording the one or more extracted video portions together with a corresponding determined significance value.

40. The device of claim 39, wherein said processor further includes:

(iv) means, coupled to said buffer, for reorganizing one or more non-extracted buffered video portions to thereby leave one or more sequential empty buffer slots followed by one or more filled buffer slots corresponding to the non-extracted buffered video portions.

41. The device of claim 39, wherein said processor further includes:

(f) means, operationally coupled to said buffer, for labeling the output video portions as one or more top level units;

and (g) means, coupled to said recording means, for organizing said one or more extracted video portions as a set of secondary units.

42. The device of claim 41, wherein said processor further includes:

(h) means, coupled to said labeling means, for enabling a user to select at least one top level unit;

and (i) means, coupled to said organizing means, for reconstructing one or more secondary units corresponding to said at least one top level unit.

43. The device of claim 37, wherein said processor further includes:

(e) means, coupled to said buffer, for organizing at least a second portion of the received uncompressed video data into one or more of the sequential empty buffer slots such that each of the two or more buffer slots is filled with one or more of the received video data segments, thereby forming two or more buffered video portions corresponding to the two or more buffered slots.

* * * * *